US012579328B2

(12) United States Patent
Del Giudice et al.

(10) Patent No.: US 12,579,328 B2
(45) Date of Patent: Mar. 17, 2026

(54) SYSTEM ON A CHIP AND METHOD GUARANTEEING THE FRESHNESS OF THE DATA STORED IN AN EXTERNAL MEMORY

(71) Applicant: Idemia Identity & Security France, Courbevoie (FR)

(72) Inventors: Lauren Del Giudice, Courbevoie (FR); Rémi Duclos, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 879 days.

(21) Appl. No.: 17/753,690

(22) PCT Filed: Sep. 15, 2020

(86) PCT No.: PCT/EP2020/075735
§ 371 (c)(1),
(2) Date: Mar. 11, 2022

(87) PCT Pub. No.: WO2021/052946
PCT Pub. Date: Mar. 25, 2021

(65) Prior Publication Data
US 2022/0343034 A1 Oct. 27, 2022

(30) Foreign Application Priority Data
Sep. 16, 2019 (FR) ...................................... 1910201

(51) Int. Cl.
*G06F 21/64* (2013.01)
*G06F 21/74* (2013.01)
*G06F 21/79* (2013.01)

(52) U.S. Cl.
CPC .............. *G06F 21/79* (2013.01); *G06F 21/64* (2013.01); *G06F 21/74* (2013.01)

(58) Field of Classification Search
CPC .......... G06F 21/79; G06F 21/64; G06F 21/74; G06F 21/71; G06F 21/575
See application file for complete search history.

(56) References Cited

U.S. PATENT DOCUMENTS 6,304,948 B1 * 10/2001 Motoyama .............. G06F 21/80
711/144
7,627,547 B2 * 12/2009 Jain ....................... G06F 16/188
(Continued)

OTHER PUBLICATIONS

Esegura., "How do you avoid adding timestamp fields to your tables? [closed]" Oct. 6, 2008 (Oct. 6, 2008). Retrieved from the Internet: https://stackoverflow.com/questions/154964/how-do-you-avoid-adding-timestamp-fields-to-your-tables [retrieved on Jun. 26, 2020] XP 055709327; p. 1.

*Primary Examiner* — Khalid M Almaghayreh
(74) *Attorney, Agent, or Firm* — NIXON & VANDERHYE

(57) ABSTRACT

The invention relates to a system on a chip comprising a secure element comprising a processing unit that is configured to send instructions to a rewritable non-volatile memory external to the system on a chip and connected thereto, the secure element further comprising a secure non-volatile memory and a secure volatile memory, wherein the processing unit of the system on a chip is configured to control:

the storage, in the rewritable non-volatile memory of at least one object having a current version, and of a dedicated directory associating an identifier of each object with an identifier of the current version of this object, the dedicated directory further comprising an identifier of its own current version; and the storage, in the non-volatile memory of the secure element, of the identifier of the current version of the dedicated directory

21 Claims, 13 Drawing Sheets

(56) References Cited

U.S. PATENT DOCUMENTS

| 2006/0207089 A1* | 9/2006 | Maenishi | H05K 13/084 |
| | | | 700/114 |
| 2007/0033375 A1* | 2/2007 | Sinclair | G06F 12/0246 |
| | | | 711/E12.008 |
| 2007/0050737 A1* | 3/2007 | Weinraub | G06F 30/33 |
| | | | 326/40 |
| 2011/0169999 A1* | 7/2011 | Grunow | H04N 23/74 |
| | | | 348/E5.022 |
| 2017/0124353 A1* | 5/2017 | Arora | G06F 21/645 |
| 2018/0060866 A1* | 3/2018 | Kurian | G07F 7/0846 |
| 2018/0165198 A1* | 6/2018 | Liu | G06F 12/0817 |
| 2019/0278914 A1 | 9/2019 | Le Roy et al. | |
| 2021/0064777 A1* | 3/2021 | Piccinini | G06F 21/6245 |

* cited by examiner

SYSTEM ON A CHIP AND METHOD GUARANTEEING THE FRESHNESS OF THE DATA STORED IN AN EXTERNAL MEMORY

TECHNICAL FIELD

The invention is in the field of security, particularly of systems on a chip with secure element a portion of whose data is stored in a memory external to the system on a chip. In particular, the invention relates to a system on a chip and methods guaranteeing the freshness of the data stored in this external memory.

STATE OF THE ART

In systems on chip (SOC) comprising a secure integrated element, the data manipulated by the secure operating system are generally stored in a memory external to the system on a chip, for reasons of costs.

Thus, for example the secure element comprises a processing unit, a volatile memory as well as a small size non-volatile memory, typically having low durability, such as an OTP (One-Time Programmable) or MTP (Multi-Time Programmable) memory while the external memory is typically a rewritable non-volatile memory having much better durability. One example is a Flash memory.

One difficulty is that the memory external to the secure element and to the SOC may be shared with applications other than those of the secure element or the SOC. In addition, it may be manipulated independently of the secure element or the SOC which therefore cannot control the use of the data it contains.

For example, the data of the external memory may be recovered in order to be reused later for fraudulent purposes. Such an attack consisting of modifying the current value of data by reusing a former value, is known by the attack name of rollback. It is even more difficult to detect in the absence of a connection enabling the "freshness" of the value used to be verified from a remote server, as for example described in document US 2017/0124353 A1.

By way of illustration, such an attack may enable the user to have access to a paid service after his subscription has ended. Another illustration of this type of attack may allow a user to reset his electronic wallet to his maximum after having emptied it.

There is a need, therefore, for a local means, that is not requiring connection to a remote server, of verifying the freshness of data from such a memory external to the SOC, especially in order to avoid rollback attacks.

OVERVIEW OF THE INVENTION

Thus, the aim of the present invention is to overcome at least one of these disadvantages.

In this context, a first aspect of the invention relates to a system on a chip comprising a secure element comprising a processing unit configured to execute a secure operating system and for sending instructions to a rewritable non-volatile memory external to the system on a chip and connected thereto, the secure element further comprising a secure non-volatile memory as well as a secure volatile memory, the system on a chip being characterized in that the processing unit is configured to control:

the storage, in the external rewritable non-volatile memory of at least one object having a current version, and of a dedicated directory associating an identifier of each object with an identifier of the current version of this object, the dedicated directory further comprising an identifier of its own current version; and the storage, in the non-volatile memory of the secure element, of the identifier of the current version of the dedicated directory.

Correlatively, a second aspect of the invention relates to a method of secure writing of an object in a rewritable non-volatile memory external to a system on a chip and connected thereto, the system on a chip comprising a secure element comprising a processing unit configured to execute a secure operating system and for sending instructions to the external rewritable non-volatile memory, the secure element further comprising a secure non-volatile memory as well as a secure volatile memory, the method being characterized in that it comprises the following steps:

ordering the writing of an identifier of the current version of the object in a dedicated directory stored in the external rewritable non-volatile memory, in association with an identifier of the object, ordering the updating of an identifier of the current version of the dedicated directory in the dedicated directory stored in the external rewritable non-volatile memory, ordering the writing of the identifier of the current version of the dedicated directory in the secure non-volatile memory of the secure element.

The invention thus claimed makes it possible to ensure the "freshness" of the data stored in the external memory of the SOC and connected thereto, that is to ensure that these data correspond well with the version expected at that time.

Indeed, by attaching a current version to each object, and by recording an identifier of that version in a dedicated directory which also has a version an identifier of which is recorded in the secure non-volatile memory of the secure element, an attack consisting in replacing the data of the object in the external memory by an older version would immediately be detected.

The general security of the system on a chip is therefore improved, without necessitating any material modification of the system on a chip. The benefit of using an external memory having better durability than the non-volatile memory of the secure element is therefore preserved.

Moreover, the version replication system used in the claimed invention makes it possible to differentiate an object that was not updated due to a simple power failure (called tearing) during writing (updating) of its data relative to an attack seeking to write old data.

Other features of the system on a chip and of the method according to some embodiments of the invention are disclosed in the dependent claims.

In some embodiments, the processing unit is configured to control the writing, in a "rollforward" type zone in the external rewritable non-volatile memory, of data to be used to update an object.

In some embodiments, the processing unit is configured to control the creation of a copy of at least a portion of the contents of the external rewritable non-volatile memory in the secure volatile memory of the secure element.

In some embodiments, the processing unit is configured to control the modification of said copy in the secure volatile memory of the secure element before modifying the external rewritable non-volatile memory.

In some embodiments, the processing unit is configured to control:

the reproduction of modifications made in the copy of the dedicated directory and of the rollforward type zone in secure volatile memory in the dedicated directory and the rollforward type zone stored in the external rewritable non-volatile memory, then the modification of the object or objects concerned stored in the external rewritable non-volatile memory in accordance with the contents of the rollforward type zone and of the dedicated directory.

In some embodiments, the processing unit is configured to control the updating of the identifier of the current version of the dedicated directory in the secure non-volatile memory of the secure element before the modification of the object or objects concerned stored in the external rewritable non-volatile memory in accordance with the contents of the rollforward type zone and of the dedicated directory.

In some embodiments, the processing unit is configured to control the reproduction of the modifications in external rewritable non-volatile memory, after several copies of objects have been modified in the secure volatile memory of the secure element.

In some embodiments, the secure non-volatile memory of the secure element is a memory with a limited lifespan of the OTP or MTP type.

In some embodiments, the identifier of the current version of an object and/or the identifier of the current version of the dedicated directory is a version number.

In some embodiments, the identifier of the current version of an object and/or the identifier of the current version of the dedicated directory is a checksum calculated from the object and/or from the dedicated directory, uniquely identifying its version.

In some embodiments, the identifier of the current version of an object and/or the identifier of the current version of the dedicated directory is a signature of the object and/or of the dedicated directory uniquely identifying its version.

In some embodiments, the processing unit carries out a first comparison function and a second comparison function in order to determine whether a version identifier corresponds to a current version or to a former version, the first function consisting in determining if the values are identical, the second function consisting in determining if said version is strictly higher than or strictly lower than the current version.

For example, the first function consists in determining if the values of the version of the copy of the directory in secure volatile memory and the one from the current version of the directory recorded in the secure non-volatile memory OTP/MTP of the secure element are identical. The second function consists in determining whether the version of the copy of the directory in secure volatile memory is strictly higher or strictly lower than the current version of the directory recorded in the secure non-volatile memory OTP/MTP of the secure element.

In some embodiments, the processing unit is configured to function both in an unsecure execution mode as well as in a secure execution mode.

In some embodiments, the processing unit is configured to control a memory controller controlling the external rewritable non-volatile memory. This controller may be on the SOC or external thereof.

In some embodiments, the method comprises a step of verifying the freshness of an object stored in the external rewritable non-volatile memory, comprising:

creating a copy of the dedicated directory and of the object in the secure volatile memory of the secure element, comparing the identifier of the current version of the dedicated directory stored in the copy (in secure volatile memory) of the dedicated directory, with the identifier of the current version of the dedicated directory stored in the secure non-volatile memory of the secure element;

if they are equal, comparing the identifier of the current version of the copy (in secure volatile memory) of the object with the identifier of the version of that object stored in the copy (in secure volatile memory) of the dedicated directory, in order to verify the freshness of the object.

In some embodiments, if there is equality of version between the identifier of the current version of the dedicated directory stored in the copy (in secure volatile memory) of the dedicated directory and the identifier of the current version of the dedicated directory stored in the secure non-volatile memory of the secure element, but there is a difference between the versions of the object indicated in the object itself and in the dedicated directory, the method comprises a step of updating the version and/or the contents of said object.

In some embodiments, this method is implemented at the boot-up of the processing unit of the secure element.

In some embodiments, the processing unit further comprises a step of writing, in a "rollforward" type zone in the external rewritable non-volatile memory, of data to be used to update an object.

In some embodiments, the processing unit carries out a first comparison function and a second comparison function in order to determine whether a version identifier corresponds to a current version or to a former version, the first function consisting in determining if the values are identical, the second function consisting in determining whether said version is strictly higher than or strictly lower than the current version.

For example, the first function consists in determining if the values of the version of the copy of the directory in secure volatile memory and the one from the current version of the directory recorded in the secure non-volatile memory OTP/MTP of the secure element are identical. The second function consists in determining whether the version of the copy of the directory in secure volatile memory is strictly higher or strictly lower than the current version of the directory recorded in the secure non-volatile memory OTP/MTP of the secure element The advantages, purposes and particular features of the methods are similar to those of the system on a chip that implements them.

In a particular embodiment, the different steps of the above-mentioned methods are determined by computer program instructions.

As a result, the invention also relates to computer programs on an information medium, these programs being capable of being implemented by a microprocessor, these programs comprising instructions suitable for implementing the steps of the methods as mentioned hereinbefore.

These programs may use any programing language and be in the form of source code, object code, or intermediate code between source code and object code, such as in a partially compiled form or in any other desirable form.

The invention also relates to an information medium that is readable by a microprocessor, and comprising computer program instructions such as mentioned hereinbefore.

The information medium may be any entity or device capable of storing the program. For example, the medium may comprise a storage medium such as a ROM, for example a microcircuit ROM, or a magnetic recording medium, for example a hard drive or even a flash memory.

Additionally, the information medium may be a transmissible medium such as an electrical or optical signal, which may be transmitted via an electrical or optical cable, by radio or by other means. The program according to the invention may in particular be downloaded to a storage platform of an Internet-type network.

Alternatively, the information medium may be an integrated circuit wherein the program is incorporated, the circuit being suitable for executing, or for being used in the execution of, the method in question.

The above-mentioned information medium and computer programs have features and advantages that are analogous to the methods that they implement.

BRIEF DESCRIPTION OF THE DRAWINGS

Other particular features and advantages of the invention will become more apparent in the following description, illustrated by the appended figures which depict examples of non-limiting embodiments.

In the following, the same references are used to designate the same elements when they appear in different figures.

DETAILED DESCRIPTION

Figure 1:
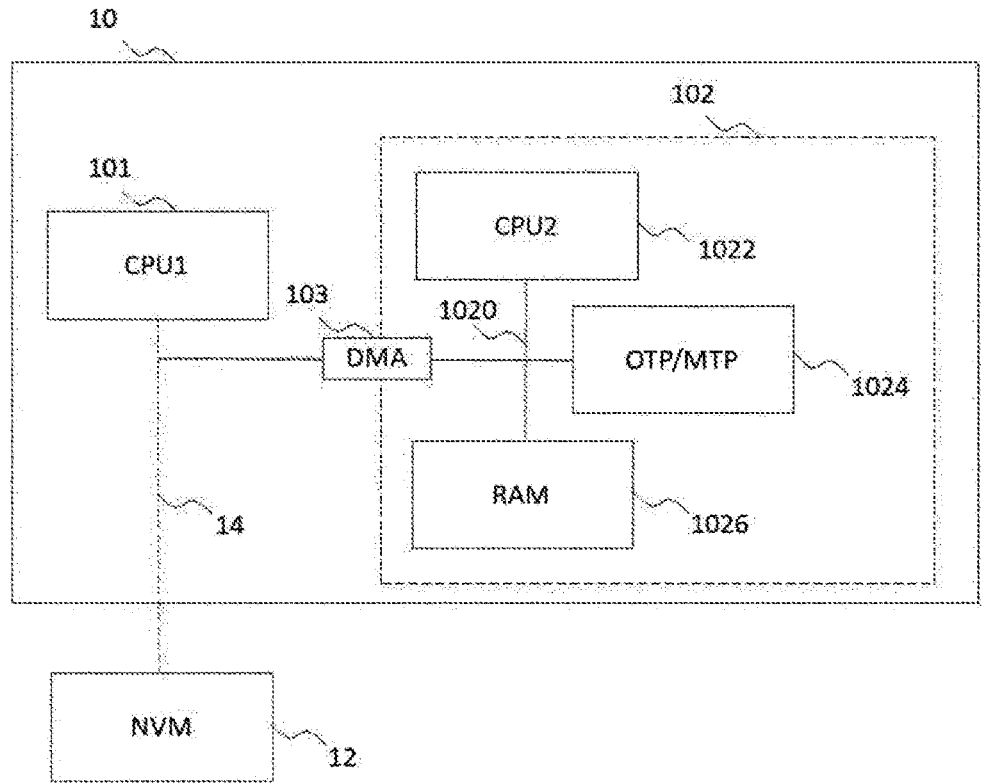
FIG. 1 shows an example of architecture for a system on a chip in accordance with embodiments of the invention.

FIG. 1 shows a possible example of architecture for a system on a chip (hereinafter SOC) in accordance with some embodiments of the invention.

According to some embodiments, the SOC 10 is configured to be connected to an external rewritable non-volatile memory NVM 12. In the following, the word "connected" means "locally connected" as opposed to a remote connection with a server. This local connection is typically implemented by means of a bus 14.

The rewritable non-volatile memory NVM 12 is typically a Flash memory, or any other memory having good durability. For the purposes of the invention, this memory may constitute a medium, in other words it may comprise a computing program comprising instructions for implementing a method in accordance with the invention. The program is then loaded into RAM memory 1026 when the SOC 10 is booted up.

In this example, the SOC 10 comprises a first processing unit or microprocessor 101 denoted CPU1 (Central Processing Unit) and a secure element 102. The first processing unit (CPU1) 101 and the secure element 102 communicate for example via a communication interface 103, for example comprising a Direct Memory Access (DMA) module or a mailbox (not shown).

The secure element 102 comprises the following elements, connected by a communication bus 1020:

a processing unit—or microprocessor—1022 denoted CPU2 utilizing a secure operating system (OS). Depending on the embodiments, this processing unit may operate in secure mode only, or in several modes (secure or not). Depending on the embodiments, this processing unit CPU2 is configured to send instructions to the CPU1 or to a memory controller (on the SOC or connected thereto) controlling the NVM memory 12 in order to act on this memory 12;

a non-volatile memory 1024, for example OTP or MTP;

a random access memory or cache memory or volatile memory 1026, for example RAM (Random Access Memory) comprising registers suitable for storing variables and parameters created and modified during the execution of the above-mentioned program; during the implementation of the invention, the program instruction codes stored in non-volatile memory (e.g. NVM) are loaded in RAM memory in order to be executed by the processing unit CPU2; and a communication interface 103 suitable for transmitting and receiving data, for example with the rewritable non-volatile memory 12 via CPU1.

The communication bus allows communication and interoperability between the various elements included in the secure element or connected thereto. The depiction of the bus is not limiting and, particularly, the processing unit CPU2 is likely to communicate instructions to any element of the secure element directly or via another element of this secure element.

It is noted that in this example, the intelligence of the invention is located at the CPU2 which transmits its instructions to the CPU1, which transfers to the memory NVM 12 via the bus 14. Indeed, the CPU1 could be a simple memory controller.

According to one variant not shown, the CPU1 could be replaced by a memory controller external to the SOC 10, to which the CPU2 would send instructions/orders directly.

In general, the OS of CPU2 uses objects as memory containers. As is known, an object is a block of bits comprising a header and data (payload). The header generally indicates the size of the data while the data incorporate information used either by an application being executed on the OS, or by the OS itself. The OS may allocate objects dynamically (during execution) or statically (at the time the image of the operating system is constructed). It may use these objects for its own needs, or for object-oriented applications by means of a virtual machine. The OS generally accesses the object by an address or an identifier that redirects to an address.

Figure 2:
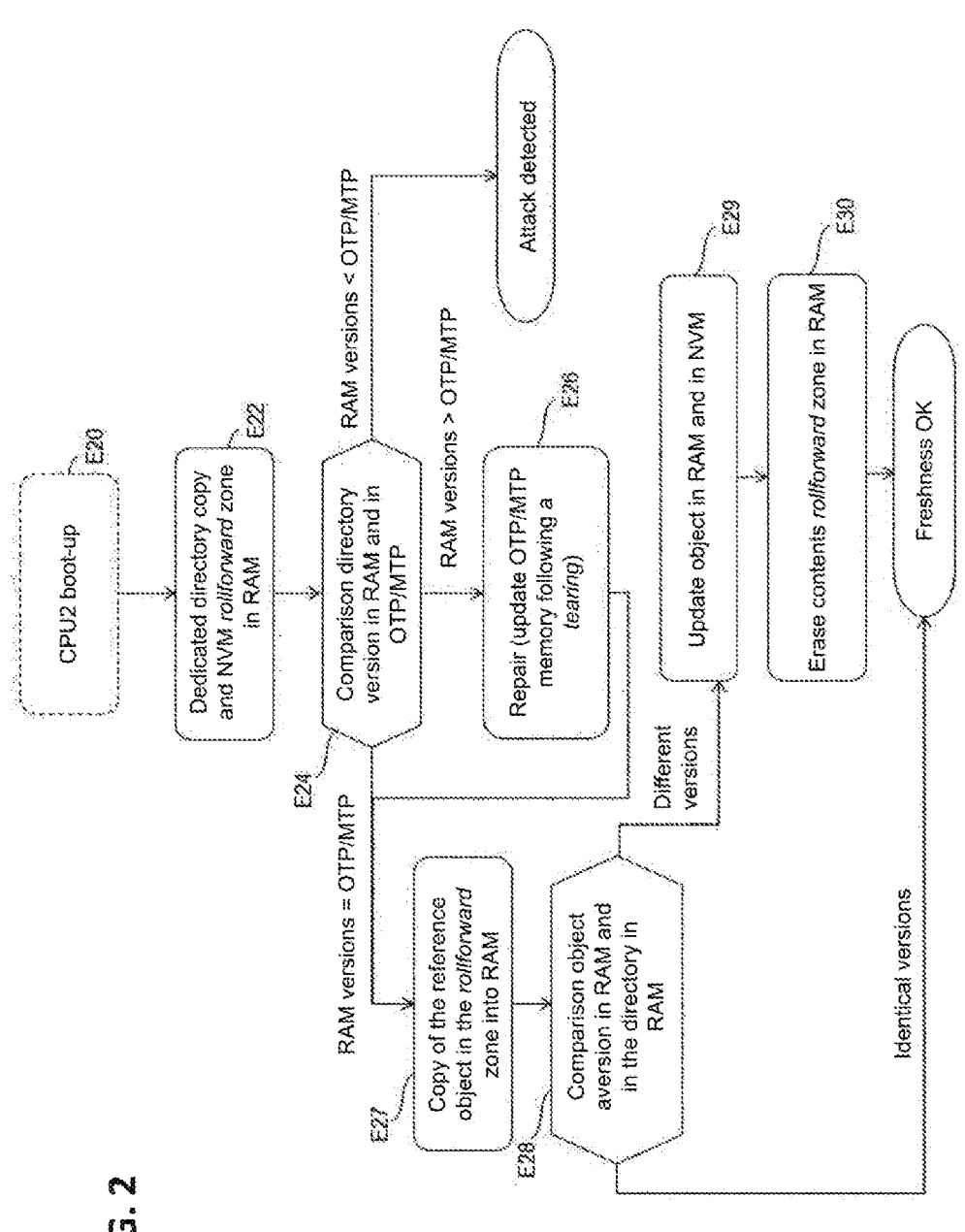
FIG. 2 shows, in flowchart form, steps implemented by the system on a chip to verify the freshness of an object in accordance with embodiments of the invention.

FIG. 2 shows, in flowchart form, steps implemented by the system on a chip to verify the freshness of an object, for example when it is read, in accordance with embodiments of the invention. Typically, the steps described are implemented by the processing unit CPU2 1022 of the secure element 102.

During a step E20, the processing unit CPU2 1022 of the secure element is booted up. It is noted that the SOC and the processing unit CPU2 1022 of the secure element generally have an independent power supply. However, the invention is not limited to this and in one embodiment, the SOC and the secure element share the same power supply.

In this example, the memory NVM 12 then comprises at least one object having a current version, as well as a dedicated directory associating an identifier of each object with an identifier of the current version of that object. The dedicated directory further comprises an identifier of its own current version.

According to the embodiments, the version identifier may be a version number, or a signature, or a checksum enabling the version to be identified in a unique way. For example, the signature may be calculated on the version number and the data of the object. In the following, for the purpose of simplicity, only the version number is considered. However, those skilled in the art will know how to transpose the following teachings to a signature or a checksum.

The NVM memory 12 may also comprise a rollforward type zone used to guarantee the atomicity and security of the updating of the data of an object. To do this, the rollforward zone comprises the data to be used to update a given object. In other words, this zone comprises the last version (the "freshest") of the data. This zone, for example, makes it possible to restore the last version of the data in an object in case of power failure and thus to avoid the corruption of an object.

In this example, the OTP/MTP memory 1024 also stores the identifier of the current version of the dedicated directory.

During a step E22, at least one portion of the content of the memory NVM 12, particularly at least the previously mentioned directory, as well as the rollforward zone present on the same memory page, are copied into RAM memory 1026 of the secure element 102.

During a step E24 the comparison is made of the identifier of the current version of the dedicated directory stored in the copy of the dedicated directory (that is, in RAM memory 1026), with the identifier of the current version of the dedicated directory stored in the secure non-volatile memory (OTP/MTP 1024) of the secure element. In the preferred assumption where the rollforward zone shares the same memory page as the dedicated directory, the identifier of the version also makes it possible to verify the validity of the content of the rollforward zone. Indeed, the integrity of a memory page is guaranteed. As a consequence, the verification of the version makes it possible to test the "freshness" of all the contents of the memory page, in other words to verify whether the contents of the page correspond to what is expected. In the case where the rollforward zone is not on the same memory page as the dedicated directory, the embodiment based on signatures or checksums may advantageously be preferred.

If it is determined in step E24 that the current version of the copy of the directory in RAM memory 1026 is strictly lower than the current version of the directory indicated in secure non-volatile memory (OTP/MTP 1024), this means that a rollback attack has occurred.

If it is determined in step E24 that the current version of the copy of the directory in RAM memory 1026 is strictly higher than the current version of the directory indicated in secure non-volatile memory (OTP/MTP 1024), this means that there has been a power failure (tearing) during the update in external non-volatile memory 12. The method then continues with a step E26 called "repair" of the secure non-volatile memory (OTP/MTP 1024) for updating the value of the version of the directory in OTP/MTP memory so that it is identical to that of the copy of the directory in RAM memory 1026. Following this repair step E26, or if it is determined in step E24 that the current version of the copy of the directory in RAM memory 1026 is equal to the current version of the directory indicated in secure non-volatile memory (OTP/MTP 1024), the method continues with step E27 during which a reference object in the copy of the rollforward zone in RAM memory is in turn copied from the NVM memory 12 into the RAM memory (reading of the object). For the purpose of simplicity, in the following it is considered that a single object is referenced in the rollforward zone but this example is not limiting and this zone could reference several objects.

During a step E28, the identifier of the current version of the copy of the object in RAM memory is compared with the identifier of the version of this object stored in the copy of the dedicated directory in RAM memory, in order to verify the freshness of this object.

If the versions match, this means that the data of this object are fresh, in other words they have the expected value.

If these versions do not match, the version of the object (if necessary) as well as the contents thereof in RAM memory 1026 are updated (step E29). The contents of the object in external non-volatile memory 12 are also updated. Once this updating step is completed, the contents of the copy of the rollforward zone in RAM memory 1026 are deleted (step E30). Preferably, the above operations are carried out when the CPU2 is booted. The copy of the directory and of the rollforward zone will then be maintained in RAM memory 1026 for the full duration of the execution.

In practice, during the last reading of an object, if the object is not already in RAM memory 1026, the respective object is copied from the external non-volatile memory 12 to the RAM memory 1026. The version of this object is compared to the one from the copy of the directory in RAM memory 1026 in order to verify the freshness of the object, in a similar way to steps E27 and the following steps.

FIG. 3 schematically shows the successive state A, B, C, D, E of the various memories concerned (RAM 1026, OTP/MTP 1024, NVM 12) during an implementation of the steps of FIG. 2, according to one particular example provided solely by way of illustration.

In this example, when the CPU2 1022 is booted up (state A, step E20), the OTP memory 1024 contains the identifier of the current version of the dedicated directory, "v3" in this instance. The NVM memory 12 comprises two objects: "Object 1" and "Object 2." Object 1 has a version v3 and contains data W. Object 2 has a version v2 and contains data Y. The NVM memory 12 also comprises a directory indicating the matching of the objects 1 and 2 and their respective version, as well as its own version, also stored in the OTP memory 1024, namely v3. The NVM memory 12 also comprises a rollforward zone which comprises the data W and Y of the objects 1 and 2.

Figure 3A:
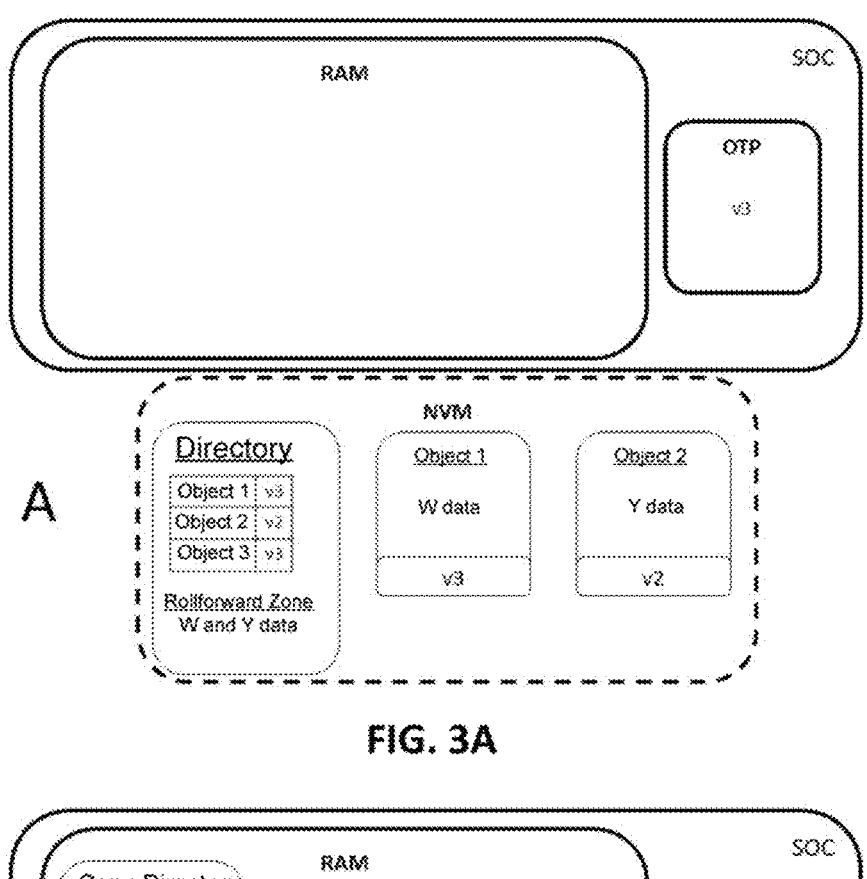
FIG. 3, which includes FIGS. 3A, 3B, 3C, 3D and 3E, schematically depicts the successive state of the different memories considered during the implementation of the steps of FIG. 2.

FIG. 3A In this state A, corresponding to the booting up of CPU2, the RAM memory 1026 is empty.

Figure 3B:
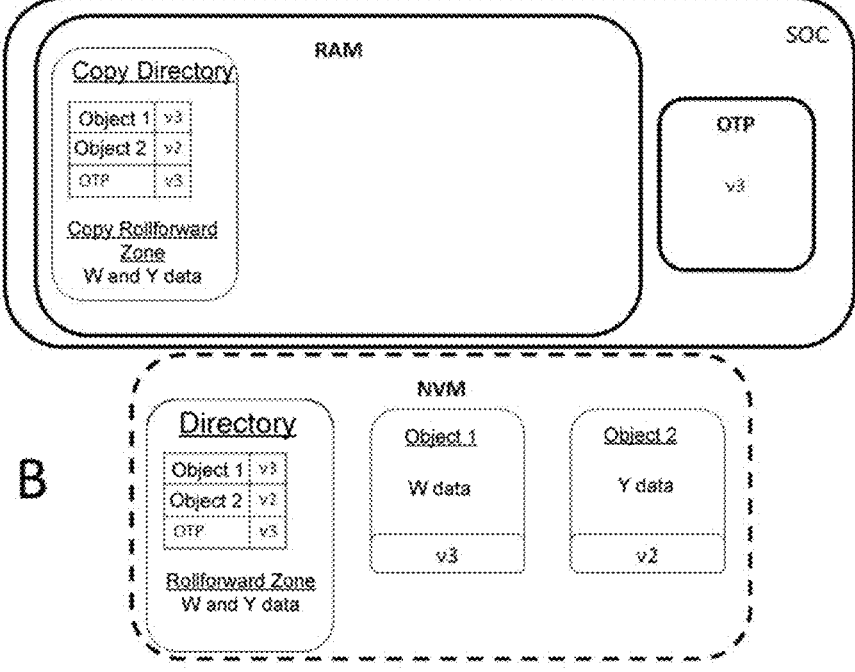

FIG. 3B State B corresponds to the results of the implementation of step E22. Thus, after copying a portion of the contents of the NVM memory 12 into the RAM memory 1026, this RAM memory 1026 comprises a copy of the previously mentioned directory as well as a copy of the rollforward zone.

Figure 3C:
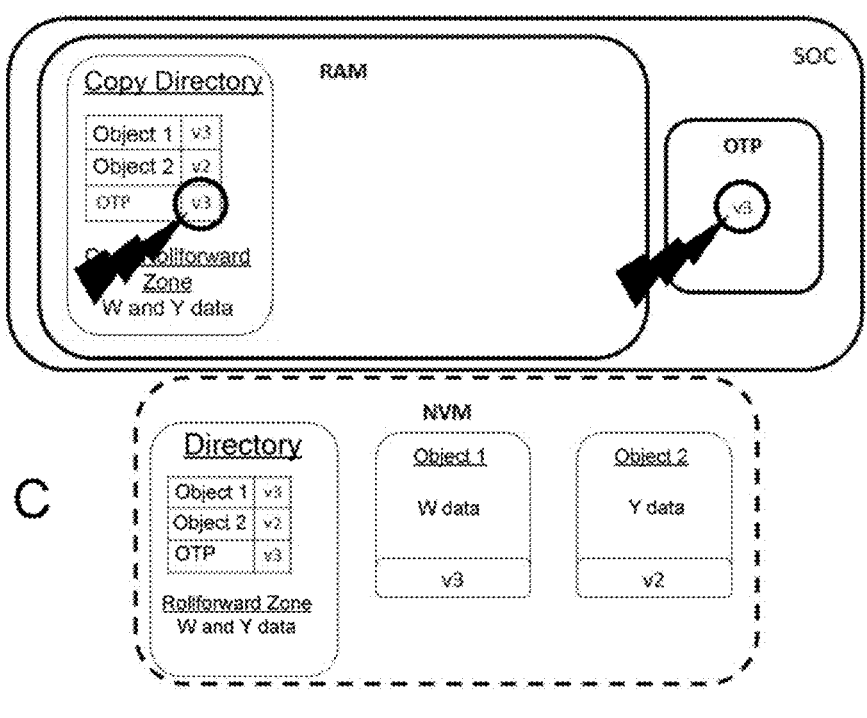

FIG. 3C State C illustrates the comparison of the versions of the directory in RAM memory 1026 and OTP 1024 during step E24. In this example, the versions match.

Figure 3D:
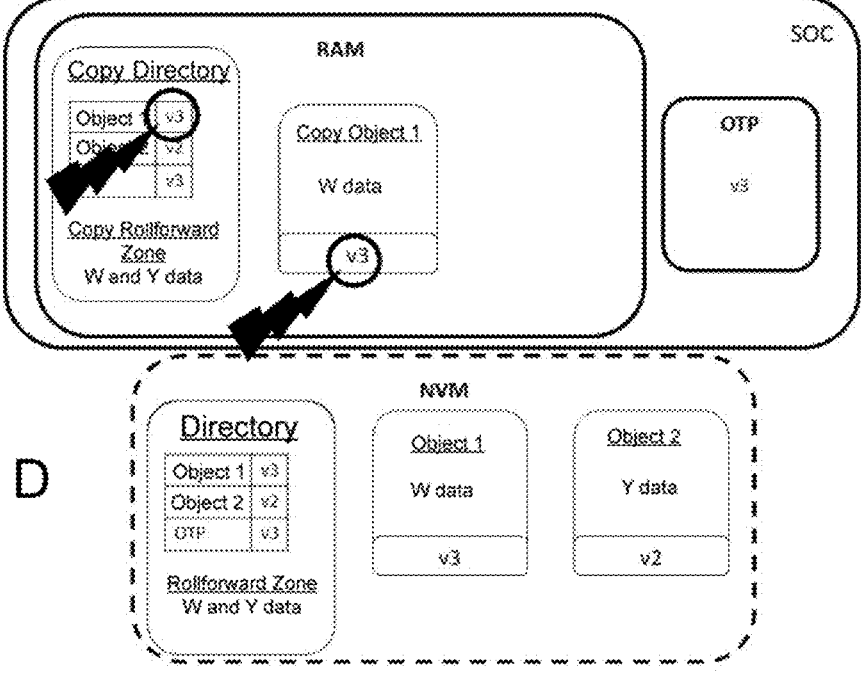

FIG. 3D State D shows the copy of the object 1 in the RAM memory 1026 during step E27, then the comparison of the versions of the object 1 in the copy of object 1 and in the copy from the directory in RAM memory 1026 during step E28. In this example, the versions match.

Figure 3E:
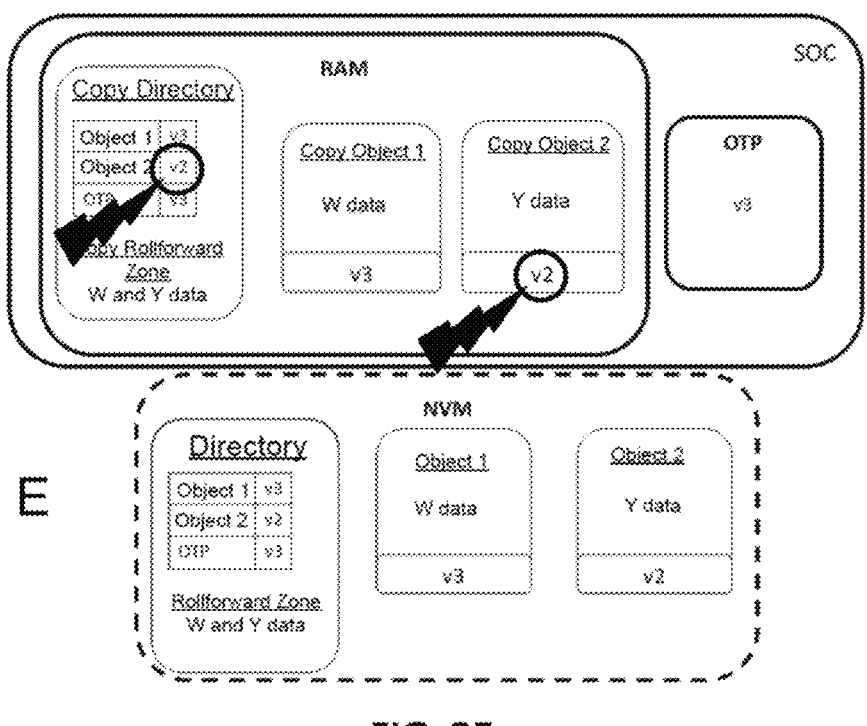

FIG. 3E State E shows the copy of object 2 in the RAM memory 1026 during step E27, then the comparison of the versions of object 2 in the copy of object 2 and in the copy of the directory in RAM memory 1026 during step E28. In this example, the versions match.

The objects therefore conform to what is expected in terms of version (freshness).

Figure 4:
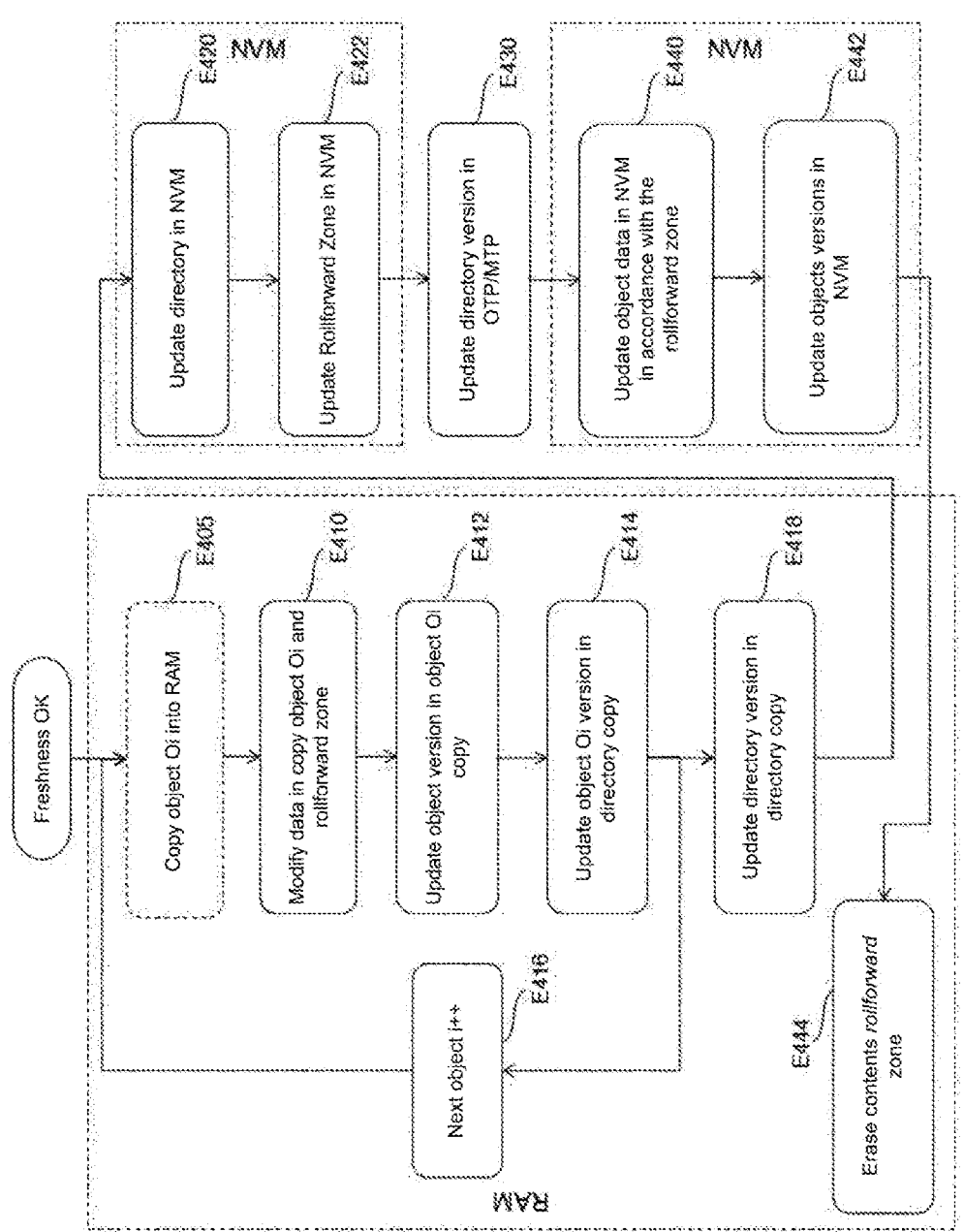
FIG. 4 shows, in flowchart form, steps implemented by the system on a chip during secure writing in accordance with embodiments of the invention.

FIG. 4 shows, in flowchart form, steps implemented by the system on a chip during secure writing in accordance with embodiments of the invention.

The method shown in FIG. 4 begins after verification of the freshness of the data (objects, directory) already present in NVM memory 12 when the CPU2 1022 is booted. Typically, this verification consists in carrying out the steps described with reference to FIG. 2.

In this example, the OTP/MTP memory 1024 also stores a copy of the identifier of the current version of the dedicated directory.

The objects are preferably processed one after the other, in other words only one object is copied at a time into the RAM memory, its version is verified, then updated if applicable.

If the number of objects for which the freshness must be verified is too large for a copy of all the objects to be able to be preserved in RAM memory, at least certain objects (which are not currently in use in an application) are deleted from the RAM memory so as to allow the verification of other objects.

During a step 405, if the object in which it is desired to write is not already present in RAM memory, a copy thereof is made in RAM memory 1026. It is then verified that its version is actually the one corresponding to its entry in the copy of the directory in volatile memory 1026.

If so, steps E410 to E418 are then implemented in the RAM memory 1026. If the versions do not match, the method assumes that it may involve an attack or a tearing and is therefore stopped preventively.

During step E410, the data of the copy of an object Oi are updated as well as in the rollforward zone. Next, the version of the object Oi is updated in the copy of this object (step E412) then in the copy of the directory (step E414).

Steps E405 to E414 are then repeated for each object in which it is desired to write (E416). Once the RAM memory and/or the rollforward zone is full and/or all the objects have been processed, the changes made in RAM memory will be able to be reflected in the NVM memory 12 (steps E420, E422, E440, E442).

Before that, the version of the directory is updated in the copy of the directory in RAM memory (step E418).

CPU2 1022 then orders the updating of the directory in NVM memory 12 (step E420). This consists for example in replacing (meaning erasing then writing in its place) the directory in NVM 12 by the copy of the one updated in RAM memory in step E418.

CPU2 1022 then orders the updating of the rollforward zone in NVM memory 12 (step E422). This consists for example in updating the rollforward zone in NVM memory 12 based on the most recent data of the objects successively updated in RAM memory. It should be noted that for the sake of completeness, writing steps E420 and E422 have been described as two distinct steps. However, in a context in which the NVM memory is in the form of memory pages, the writing is done only once on the same NVM memory page. In such a context, the writing is considered as being done (all data written) or not done (no data written).

The CPU2 1022 orders the updating of the version of the directory in the OTP/MTP memory (step 430).

CPU2 1022 then orders the updating of the objects in NVM memory 12, i.e., of their data (step E440) in accordance with the rollforward zone updated in step E422, as well as their own version (step E442).

It should be noted that in the example described with reference to FIG. 4, the version of the directory is updated in step E418 after several objects Oi have been modified. This group of modifications makes it possible to limit the number of writings in OTP/MTP memory (step E430) and to optimize the longevity thereof. As an alternative, the version of the directory could be updated in RAM memory with each writing in an object (step E418 incorporated in the loop), only the last version of the directory then being written in OTP/MTP memory in step E430. This would also make it possible to limit the number of writings in OTP/MTP memory and to optimize the longevity thereof.

In a last step (E444), CPU2 1022 then erases the contents of the rollforward zone in volatile memory 1026.

FIG. 5 schematically depicts the successive state (A to M) of the various memories concerned (RAM 1026, OTP/MTP 1024, NVM 12) during the implementation of the steps of FIG. 4, according to one particular example provided solely by way of illustration.

In this example, when the CPU2 1022 is booted (state A, step E400), the OTP memory 1024 contains the identifier of the current version of the dedicated directory, "v3" in this instance. The NVM memory 12 comprises two objects: "Object 1" and "Object 2." Object 1 has a version v3 and contains data W. Object 2 has a version v2 and contains data Y. The NVM memory 12 also comprises a directory indicating the matching of the objects 1 and 2 and their respective version, as well as its own version, also stored in the OTP memory 1024, namely v3. The NVM memory 12 also comprises a rollforward zone which comprises the data W and Y of the objects 1 and 2.

Figure 5A:
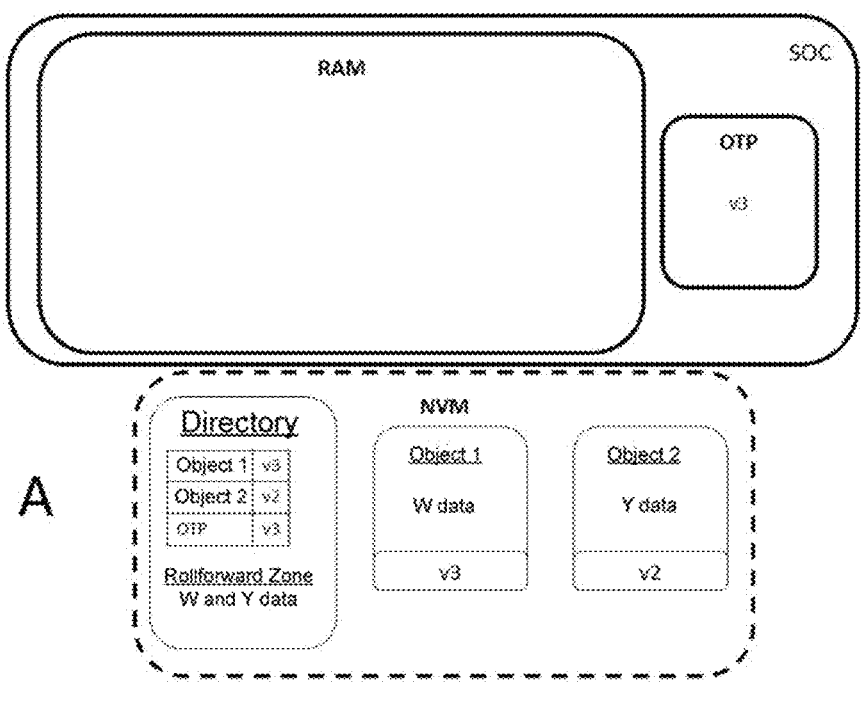
FIG. 5, which includes FIGS. 5A to 5M, schematically depicts the successive state of the different memories considered during the implementation of the steps of FIG. 4.

FIG. 5A In this state A, corresponding to the booting up of CPU2 1022, the RAM memory 1026 is empty.

Figure 5B:
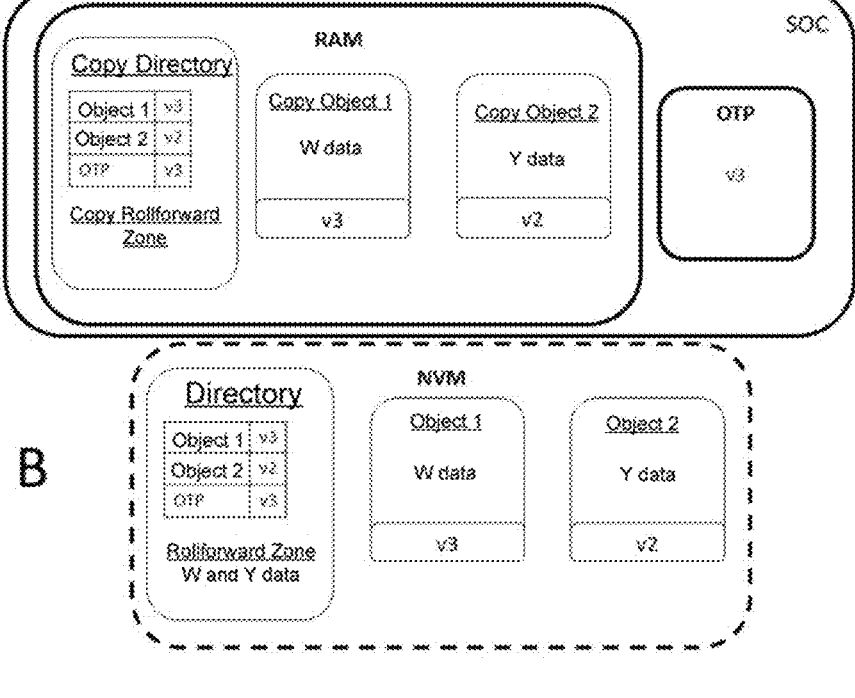

FIG. 5B State B corresponds to the result of the verification of the "freshness" of the data (objects, directory) already present in NVM memory 12 when the CPU2 1022 is booted, in other words after implementation of the steps described with reference to FIG. 2.

At this stage, the RAM memory 1026 comprises a copy of the aforementioned directory, a copy of object 1, a copy of object 2 as well as a copy of the rollforward zone, the contents of which have been erased (step E30 of FIG. 2) upon completion of the verification of the initial freshness.

Figures 5C, 5D:
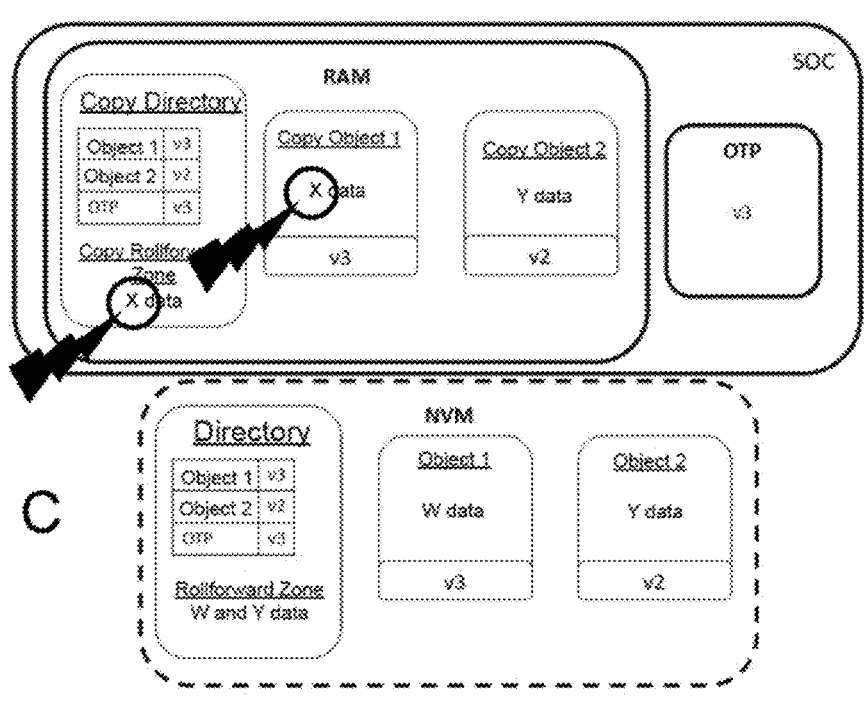

FIG. 5C State C illustrates the writing of data X (replacing data W) in the copy of object 1 and in the copy of the rollforward zone (step E410) in RAM memory.

FIG. 5D State D illustrates the updating of the version of object 1 (v4 instead of v3) in the copy of object 1 in RAM memory 1026 (step E412).

Figure 5E:
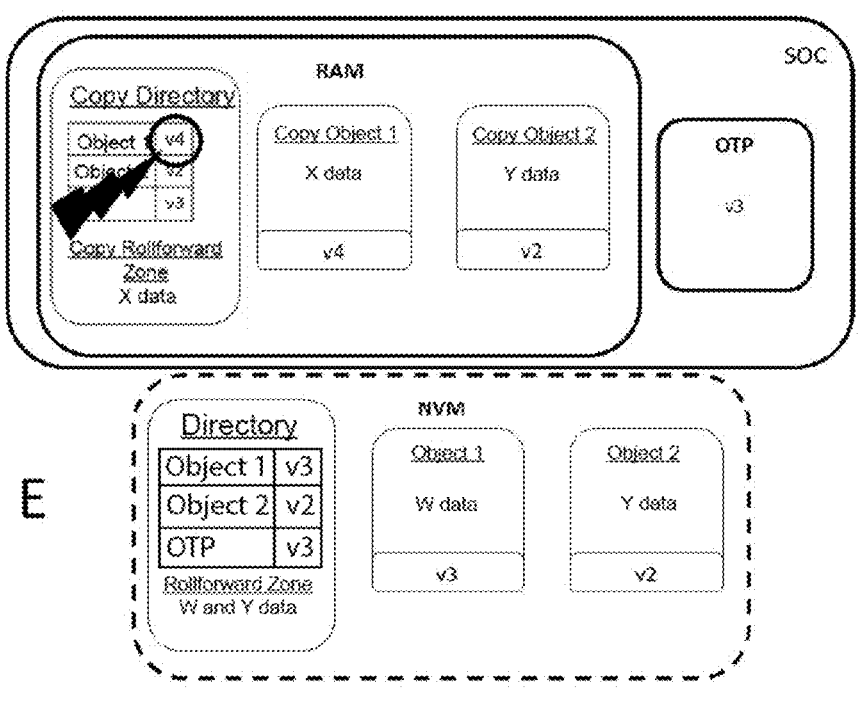

FIG. 5E State E illustrates the updating of the version of object 1 (v4 instead of v3) in the copy of the directory in RAM memory 1026 (step E414).

Figure 5F:
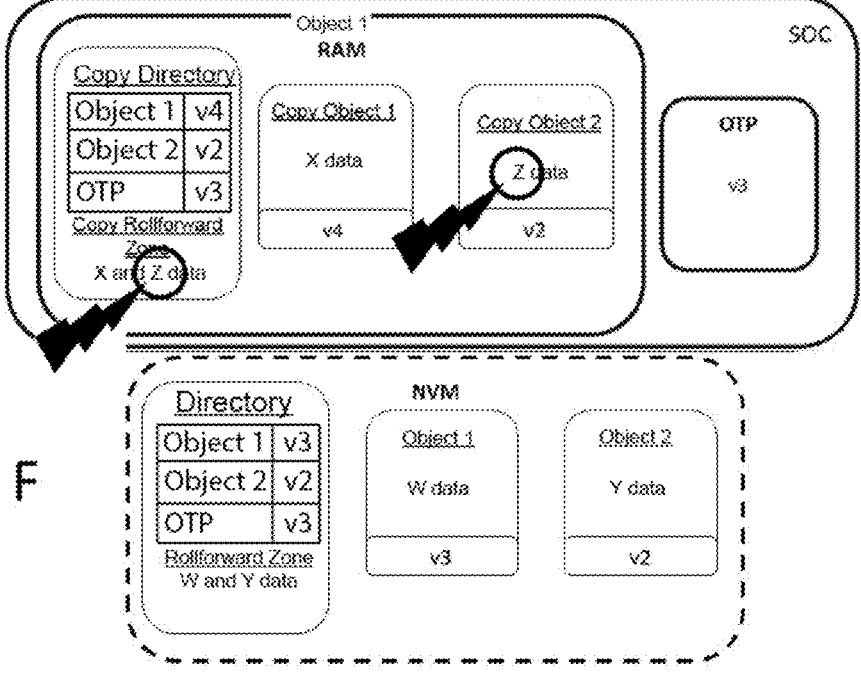

FIG. 5F State F illustrates the writing of data Z (replacing data Y) in the copy of object 2 and in the copy of the rollforward zone (second step E410) in RAM memory.

Figure 5G:
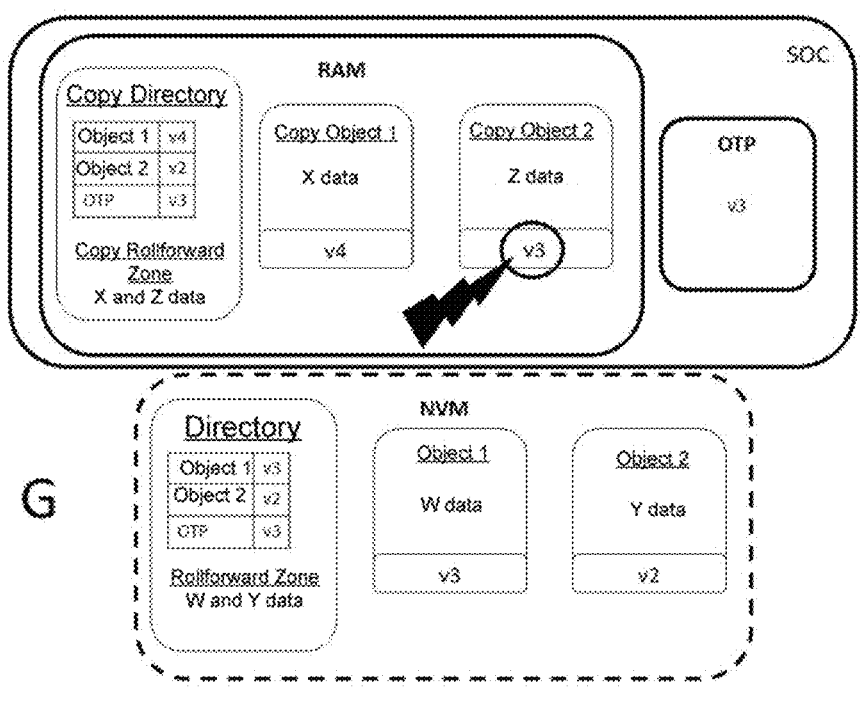

FIG. 5G State G illustrates the updating of the version of object 2 (v3 instead of v2) in the copy of object 2 in RAM memory 1026 (second step E412).

Figure 5H:
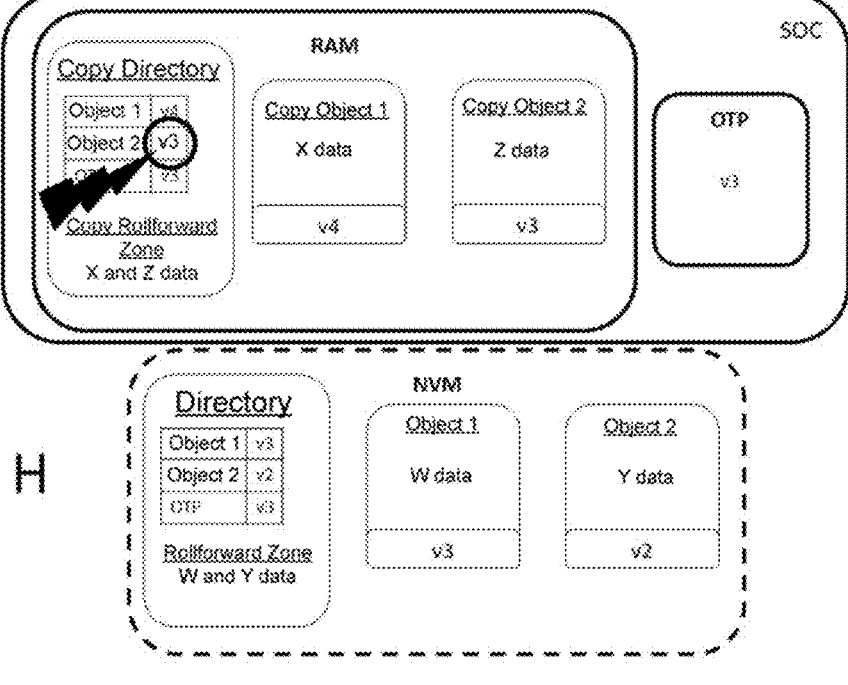

FIG. 5H State H illustrates the updating of the version of object 2 (v3 instead of v2) in the copy of the directory in RAM memory 1026 (second step E414).

Figure 5I:
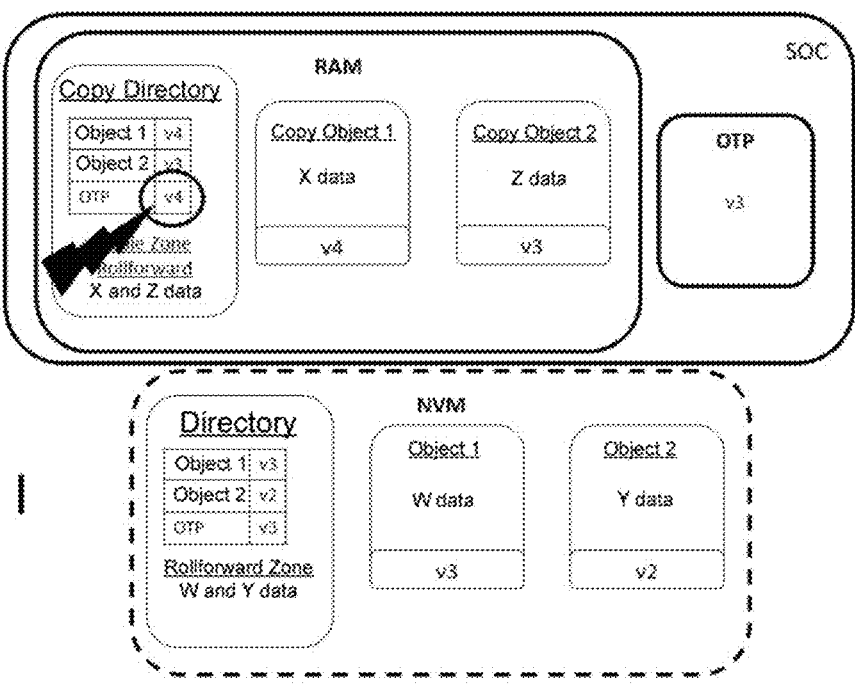

FIG. 5I All objects having been processed, the version of the directory is updated (v4 instead of v3) in the copy of the directory (step E418), as illustrated in state 1.

If a power failure (tearing) of CPU2 1022 occurs before step E420, this results in erasing the contents of the RAM memory. However, since neither the NVM memory nor the OTP memory have been updated, the versions of the objects (v3 for object 1 and v2 for object 2) in the directory and in the objects themselves match and the versions of the directory (v3) in the directory in NVM and in the OTP memory also match. It is therefore easy to verify that a rollback attack was not involved. Thus, a false positive has been avoided that would indicate a bad version only because of the power failure, without however being attributable to a rollback attack.

Figure 5J:
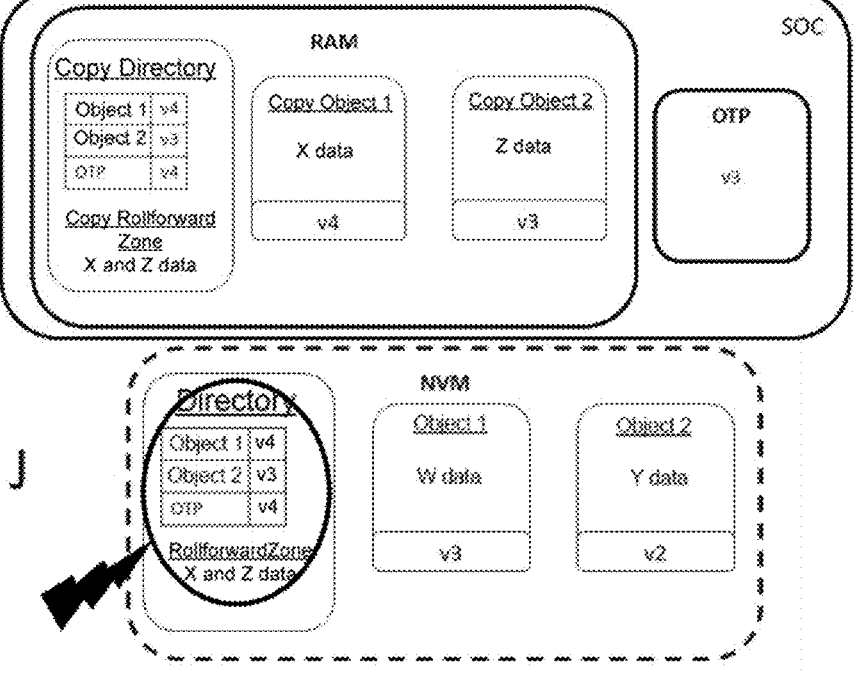

FIG. 5J State J illustrates the updating of the directory in NVM memory (step E420) as well as the rollforward zone (step 422) in accordance with the modified copies of the directory and objects successively updated in the copy of the rollforward zone in RAM memory.

A power failure (tearing) of the CPU2 1022 occurring between steps E422 and E430 results in the erasing the contents of the RAM memory while the directory and the rollforward zone have been updated in the NBM 12 memory. However, the contents of the rollforward zone (X and Y) differ from that of the objects in NVM memory 12 (W and Z), and since no updating of the OTP memory has occurred, the versions of the directory in NVM (v4) and in the OTP memory (v3) also differ. This indicates that a power failure has occurred before the updating of the secure memory OTP or that a rollback attack has occurred, which explains the divergence of the contents and versions. In order to verify that a rollback attack was not involved, it can be verified if the version of the directory in NVM is strictly higher than that of the OTP memory (see step E24).

Figure 5K:
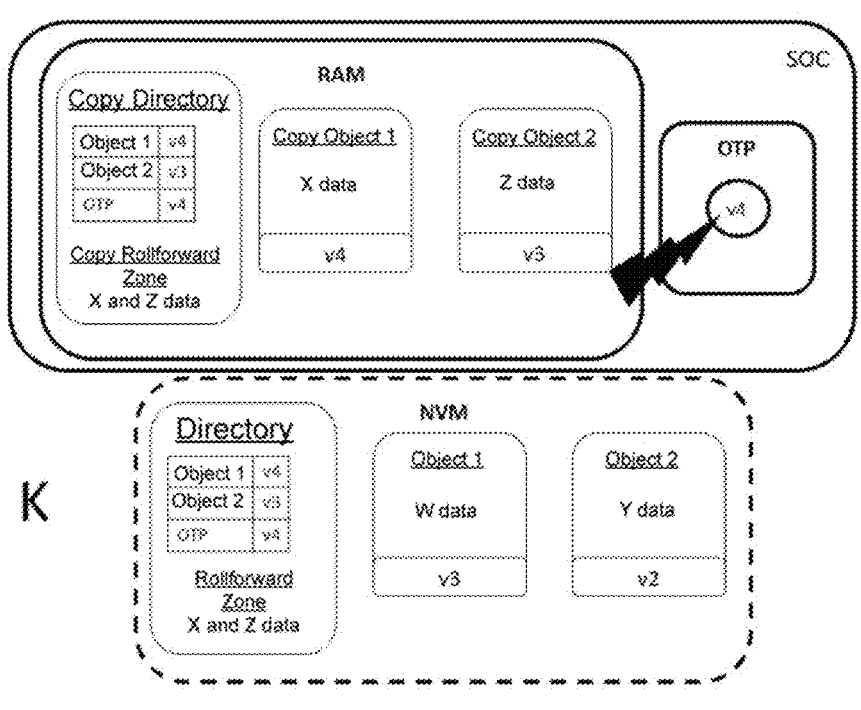

FIG. 5K State K illustrates the updating of the OTP memory (v4 instead of v3) of step E430.

A power failure (tearing) of CPU2 1022 occurring between steps E430 and E440 results in the erasing the contents of the RAM memory although the objects in NVM memory 12 have not been updated. However, since the directory and the rollforward zone have been updated in the NVM memory 12 and the OTP memory has also been updated, it is possible to know reliably the contents and the version that should have the objects in NVM memory 12. Indeed, the correspondence between the versions of the directory in the directory in NVM memory and in the OTP memory (v4) indicates that the versions of the objects indicated in the directory are good (the "freshest"), and that the contents of the rollforward zone are also good. The objects then only need to be updated based on these elements. To do this, these elements will be copied into RAM memory (see steps E28, E29).

Figure 5L:
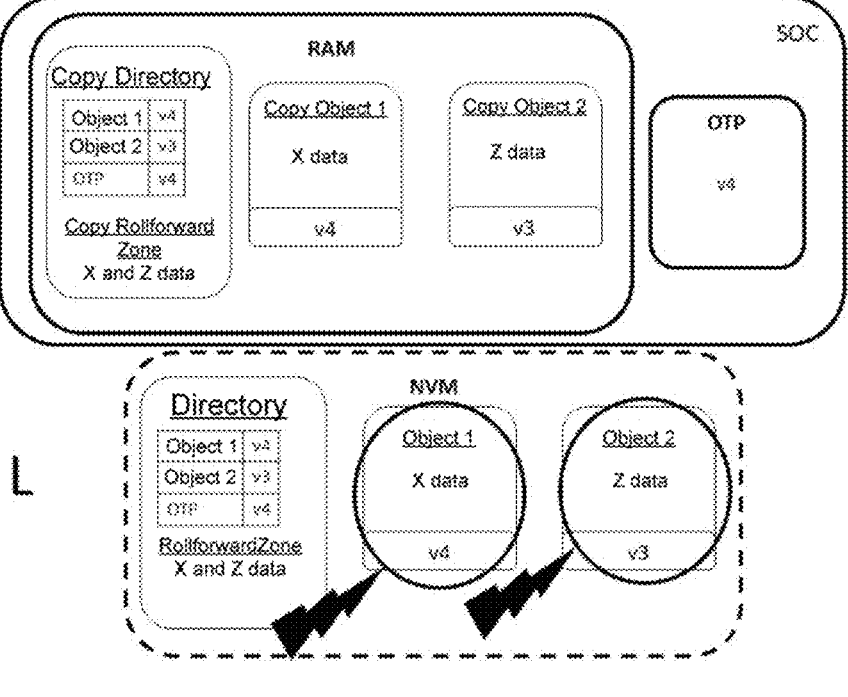

FIG. 5L State L illustrates the updating of objects 1 and 2 in NVM memory 12, in other words of their contents in accordance with the contents of the rollforward zone updated in step E422: X and Z instead of W and Y (step E440) and of their version (step E442).

Figure 5M:
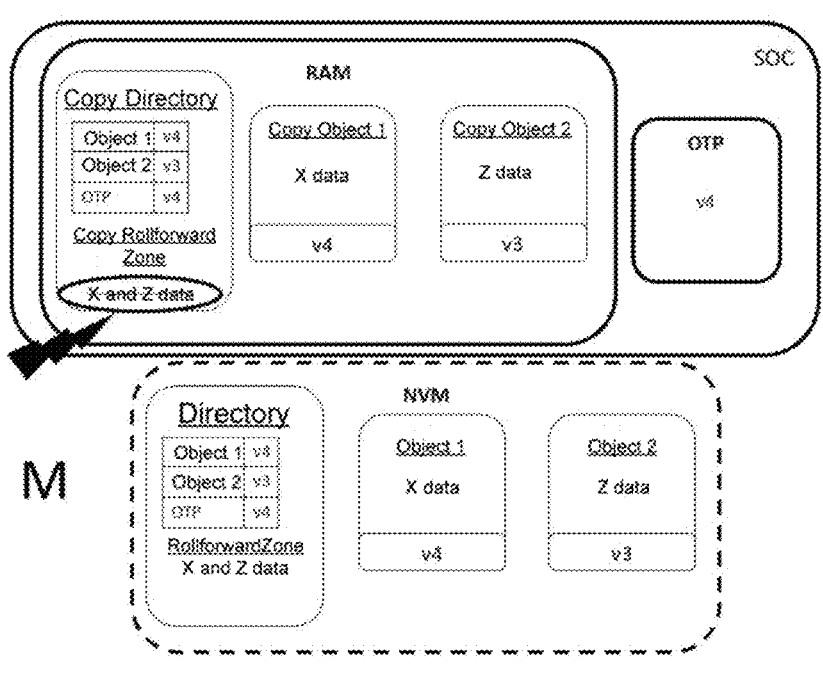

FIG. 5M Finally, state M illustrates the erasure of the contents of the rollforward zone in RAM (step E444) once the contents and version of the objects of the NVM are updated.

In general, it should be noted that the version number of an object provides information about the rate of wear of some zones of the NVM memory. For example, a high version number indicates that an object has been modified numerous times. This information in particular enables better management of the memory. Thus, a better distribution of the writings in the NVM memory may be made in order to avoid premature wear of a particular zone.

In one embodiment, the versions of each object are not incremented relative to their former version as described with reference to step E412; rather, the value in OTP/MTP 1024 is assigned to them, increased by 1.

Advantageously, this allows the acceleration of the performance of an incremental garbage collection making it possible to execute steps of a cycle alternating with the execution of the application. If the color abstraction, well known to the person skilled in the art, introduced by Dijkstra et al. [1976, 1978] is used, an object is:

white if it is never found during the marking phase, gray if it was found during the marking phase, black if it was found during the marking phase and all its references were scanned in order to gray out the referenced objects.

During the resumption of marking, care will be taken to return to gray all black objects the version number of which is higher than the maximum of the versions of the objects during the preceding marking step. A write barrier of the incremental garbage collection will therefore be avoided on objects during execution of the application (mutator).

The preceding examples are only non-limiting embodiments of the invention. For example, for the purpose of simplification, the description primarily relates to object-oriented systems. However, it could apply to a system of a different nature.

The invention claimed is:

1. A system on a chip comprising a secure element comprising a processing unit configured to execute a secure operating system and to send instructions to a rewritable non-volatile memory external to the system on a chip and connected thereto, the secure element further comprising a secure non-volatile memory as well as a secure volatile memory, the processing unit of the system on a chip being configured to:

store, in the external rewritable non-volatile memory:

a current version of at least one object, and a dedicated directory associating an identifier of each given object of said at least one object with an identifier of the current version of the given object, the dedicated directory further comprising an identifier uniquely identifying its own current version; and store, in the non-volatile memory of the secure element, the identifier uniquely identifying the current version of the dedicated directory.

2. The system on a chip according to claim 1, wherein the processing unit is further configured to:

write, in a "rollforward" type zone in the external rewritable non-volatile memory, data to be used to update one of said at least one object.

3. The system on a chip according to claim 2, wherein the processing unit is further configured to:

create a copy of at least a portion of the contents of the external rewritable non-volatile memory in the secure volatile memory of the secure element.

4. The system on a chip according to claim 3, wherein the processing unit is further configured to:

modify said copy in the secure volatile memory of the secure element before modifying the external rewritable non-volatile memory.

5. The system on a chip according to claim 4, wherein the portion of the contents of the external rewritable non-volatile memory copied into the secure volatile memory of the secure element comprise the dedicated directory and the data stored in the rollforward type zone, the processing unit being further configured to:

reproduce:

the modifications made on the copy of the dedicated directory in the secure volatile memory in the dedicated directory stored in the external rewritable non-volatile memory;

reproduce:

the modifications made on the copy of the rollforward type zone in the secure volatile memory in the rollforward type zone stored in the external rewritable non-volatile memory, then;

modify the object or objects concerned that are stored in the external rewritable non-volatile memory in accordance with the content of the rollforward type zone and of the dedicated directory.

6. The system on a chip according to claim 5, wherein the processing unit is further configured to:

update the identifier uniquely identifying the current version of the dedicated directory in the secure non-volatile memory of the secure element before said modifying the object or objects concerned that are stored in the external rewritable non-volatile memory in accordance with the contents of the rollforward type zone and of the dedicated directory.

7. The system on a chip according to claim 5, wherein the processing unit is further configured to reproduce the modifications in the external rewritable non-volatile memory, after several copies of the objects have been modified in the secure volatile memory of the secure element.

8. The system on a chip according to claim 1, wherein the secure non-volatile memory of the secure element is a memory with a limited lifespan of either One Time Programmable, OTP, or Multi Time Programmable, MTP, type.

9. The system on a chip according to claim 1, wherein the identifier of the current version of one of the at least one objects and/or the identifier uniquely identifying the current version of the dedicated directory is a version number.

10. The system on a chip according to claim 1, wherein the identifier of the current version of one of the at least one objects and/or the identifier of uniquely identifying the current version of the dedicated directory is a signature or a checksum calculated based on the object and/or the dedicated directory.

11. The system on a chip according to claim 1, wherein the processing unit carries out a first comparison function and a second comparison function in order to determine whether a version identifier value corresponds to a current version value or to a former version value, the first comparison function comprising determining whether the version identifier values are identical, the second comparison function comprising determining whether said version identifier is strictly higher than or strictly lower than the current version.

12. The system on a chip according to claim 1, wherein the processing unit is configured to function both in an unsecure execution mode and in a secure execution mode.

13. The system on a chip according to claim 1, wherein the processing unit is configured to control a memory controller controlling the external rewritable non-volatile memory.

14. A method of secure writing of an object in a rewritable non-volatile memory external to a system on a chip and connected thereto, the system on a chip comprising a secure element comprising a processing unit configured to execute a secure operating system and for sending instructions to the external rewritable non-volatile memory, the secure element further comprising a secure non-volatile memory as well as a secure volatile memory, the method comprising:

writing:

an identifier of the object, and an identifier of a current version of the object in a dedicated directory stored in the external rewritable non-volatile memory;

updating an identifier uniquely identifying a current version of the dedicated directory in the dedicated directory stored in the external rewritable non-volatile memory; and writing the identifier uniquely identifying the current version of the dedicated directory in the secure non-volatile memory of the secure element.

15. The method according to claim 14, further comprising:

verifying freshness of the object stored in the external rewritable non-volatile memory, the verifying comprising:

creating a copy of the dedicated directory and a copy of the object in the secure volatile memory of the secure element, comparing:

the identifier uniquely identifying the current version of the dedicated directory stored in the copy of the dedicated directory with the identifier uniquely identifying the current version of the dedicated directory stored in the secure non-volatile memory of the secure element;

if the identifier of the current version uniquely identifying the dedicated directory stored in the copy of the dedicated directory matches the identifier of the current version uniquely identifying the dedicated directory stored in the secure non-volatile memory of the secure element, comparing:

the identifier of the current version of the copy of the object with the identifier of the version of this object stored in the copy of the dedicated directory in order to verify the freshness of the object.

16. The method according to claim 14, implemented at the boot-up of the processing unit of the secure element.

17. The method according to claim 14, wherein the identifier of the current version of the object and/or the identifier uniquely identifying the current version of the dedicated directory is a version number.

18. The method according to claim 14, wherein the identifier of the current version of the object and/or the identifier of the current version uniquely identifying the dedicated directory is a signature or a checksum calculated based on the object and/or the dedicated directory.

19. The method according to claim 14, further comprising a writing step, in a "rollforward" type zone in the external rewritable non-volatile memory, of data to be used to update the object.

20. The method according to claim 14, wherein a first comparison function and a second comparison function are implemented in order to determine if the identifier of the version of the object or the dedicated directory matches a current version or a former version of the object or the dedicated directory, the first function comprising determining whether the identifier of the version of the object or the dedicated directory is identical to a current version or a former version of the object or the dedicated directory, the second function consisting in determining whether the identifier of the version of the object or the dedicated directory is strictly higher than or strictly lower than the current version of the object or the dedicated directory.

21. The method according to claim 15, further comprising:

updating the version and/or of the contents of said object if a difference is detected during said comparison of the identifier of the current version of the copy of the object with the identifier of the version of the object stored in the copy of the dedicated directory.

\* \* \* \* \*